United States Patent Office 3,222,136
Patented Dec. 7, 1965

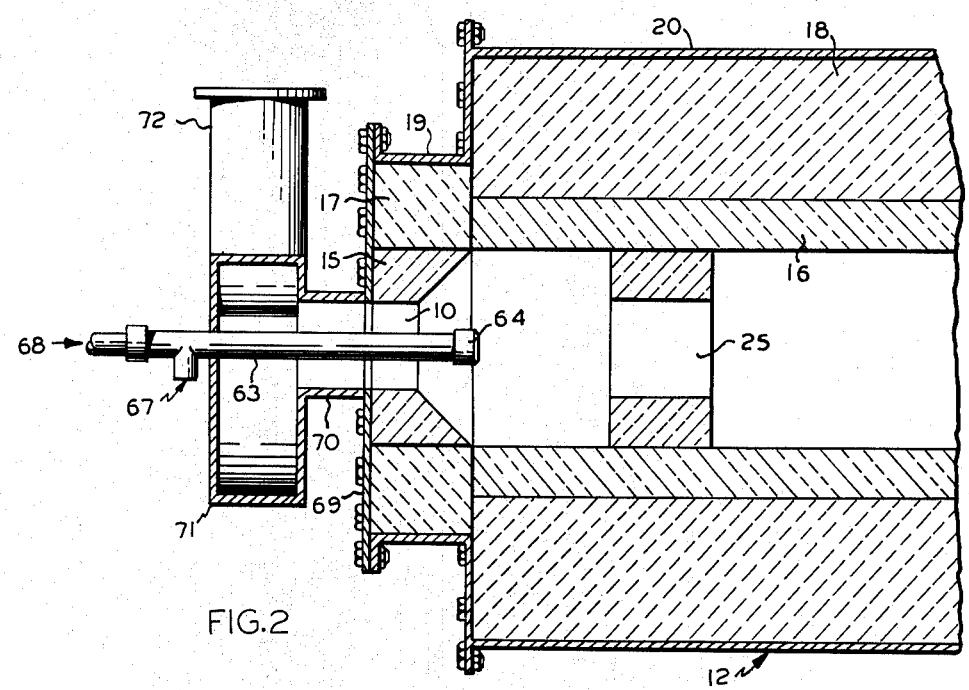
FIG.2
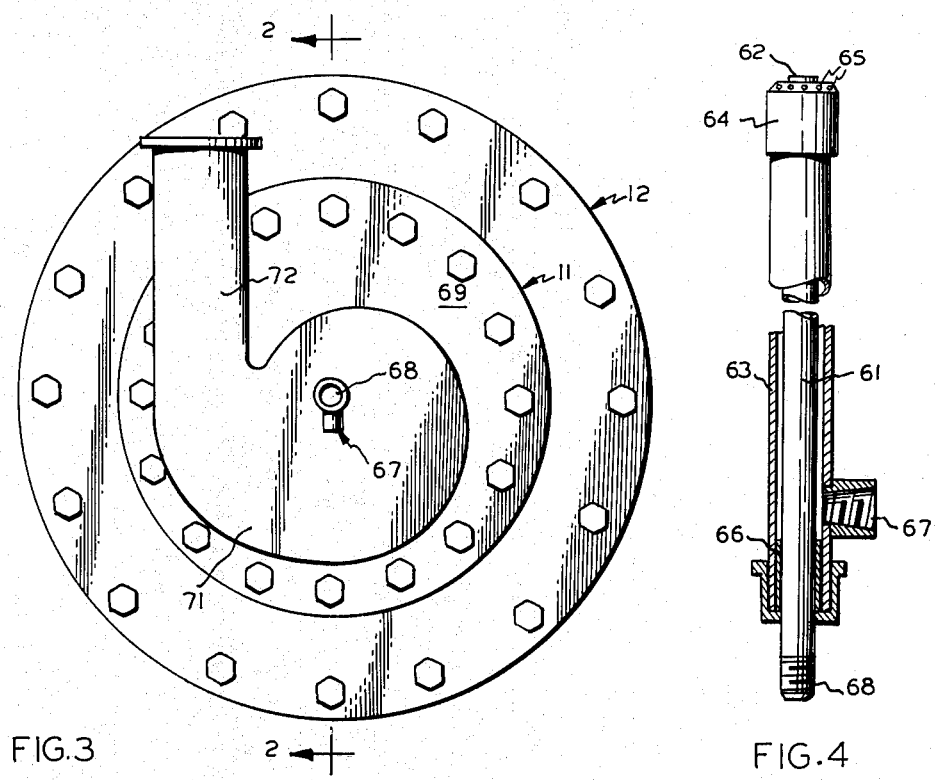
FIG.3
FIG.4

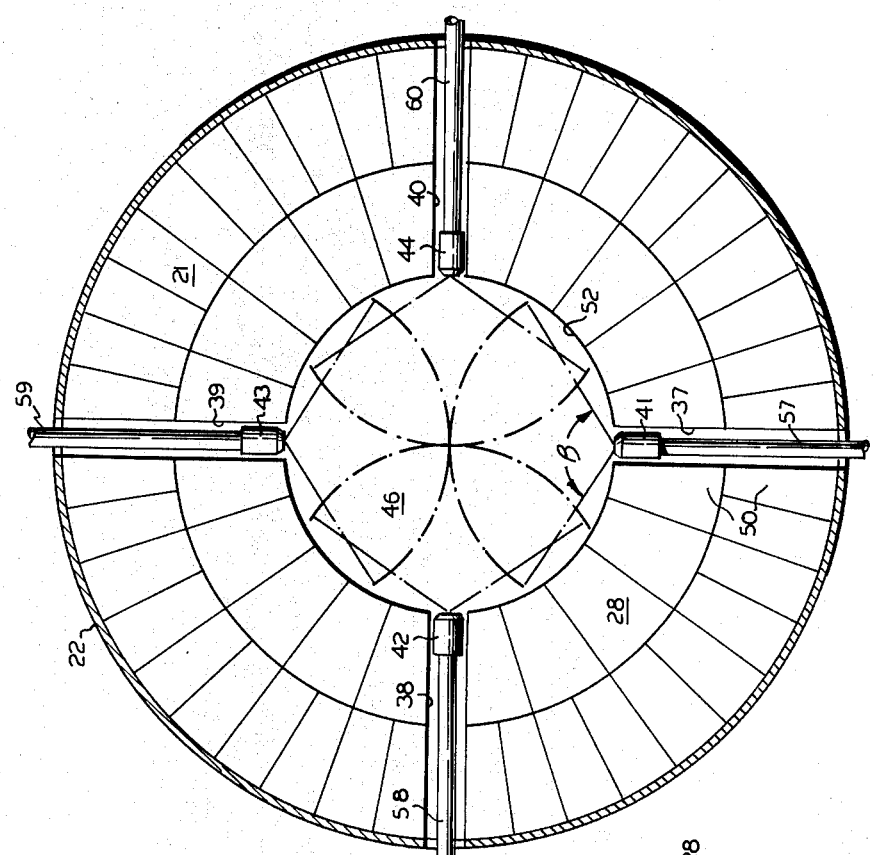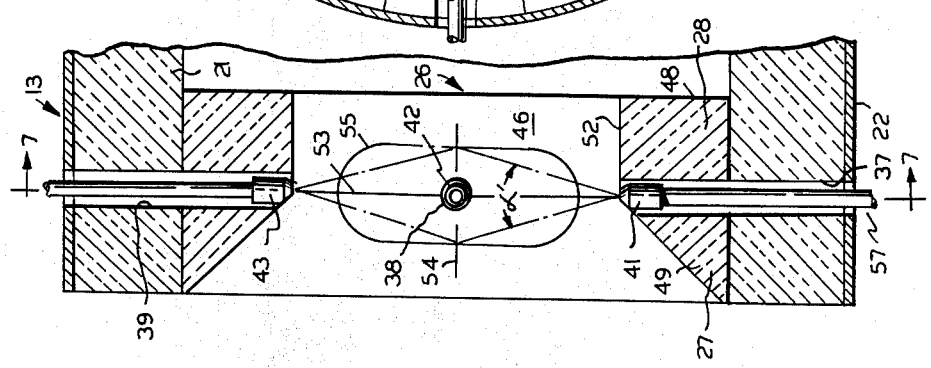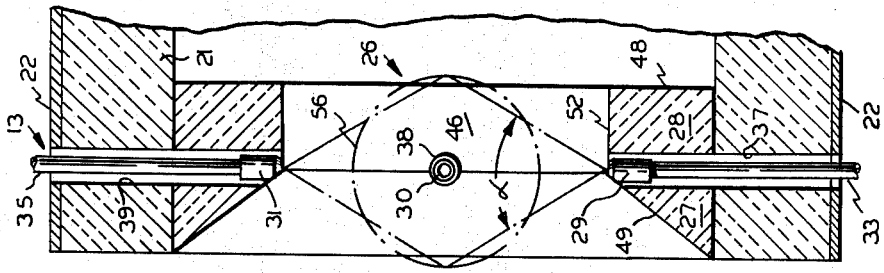

3,222,136
CARBON BLACK APPARATUS
Frank R. Hess, Houston, Tex., and James A. Guthrie, Mojave, Calif., assignors, by mesne assignments, to Ashland Oil & Refining Company, Ashland, Ky., a corporation of Kentucky
Filed Nov. 13, 1962, Ser. No. 236,858
15 Claims. (Cl. 23—259.5)

This invention relates to carbon black. More particularly it relates to the preparation of carbon black. Still more particularly, it relates to apparatus for producing carbon black from gaseous, vaporizable and atomizable hydrocarbons.

The preparation of furnace-type carbon blacks by thermal decomposition of a gaseous or liquid hydrocarbon is well known. In general, this method of preparation is conducted in a reactor having an elongated, generally tubular reaction chamber or "tunnel" into which the hydrocarbon feed stock is injected in a relatively continuous fashion. A fiery, turbulent blast of combustion-product gases is introduced into one end of the tunnel, the upstream end, and travels through the tunnel to the opposite or downstream end. During the course of their passage downstream the combustion-product gases contact the injected feed stock, disperse it, mix with it and heat it while sweeping it along towards the downstream end of the tunnel. During the course of its journey through the tunnel in the company of the combustion gases, the feed stock quickly reaches a characteristic temperature, usually 2,000° F. to 2,600° F., at which it decomposes into fine carbon black particles, hydrogen, varying amounts of low molecular weight hydrocarbons, and under certain conditions, quantities of residual tars. The hot combustion gases and decomposition products then pass out of the tunnel into downstream cooling and collection equipment.

It is an interesting fact that all carbon black is not the same. That is, carbon black can be produced in various grades displaying different properties which make certain grades more useful than others for incorporation in specified end products. Due to a growing awareness of the differences in various grades of carbon black and of the effects which these differences have on the quality of their products, industrial users of carbon black have created an ever increasing demand for more distinctive grades of carbon black and for better quality control within a given grade. The result has been a proliferation of the number of different grades of carbon black available in recent years.

Now the quality and grade of carbon black produced in a given reactor are controlled by various factors of furnace construction and operation. Among these variables are reaction temperature, the type of feed stock employed, the manner of injecting it, the peripheral velocity and turbulence of the combustion gases and feed stock in the chamber, the ratio of refractory surface to chamber volume and the reaction time, i.e., the length of time through which the decomposing feed stock and products thereof are held within the decomposition temperature range. There has been and continues to be considerable study of methods and means for controlling these variables more efficiently. Such study has resulted in various improvements and modifications of furnace design.

It is known that subjection of the decomposition products produced in the reactor to a lengthy cooling process will lead to undesirable recombination thereof and to the growth of the fine carbon black particles into undesirably large particles. Consequently, it has become a common practice to quench the decomposition products and combustion gases, aptly termed "smoke" by those skilled in the art, before they leave the reactor tunnel. Quenching is the injection into the smoke of relatively cool quenching fluid, commonly water, to cool it suddenly to a temperature, usually less than 1,900° F., at which excessive particle growth and recombination of the products is minimized. Such a swift reduction in the temperature of the combustion gases and decomposition products furnishes a means of controlling the reaction time and consequently the grade and quality of black produced. Nevertheless quenching, as it is most commonly practiced, does not cool the smoke sufficiently to prevent damage to downstream collection equipment such as electrostatic precipitators, which cannot long withstand temperatures in excess of 400° to 600° F. Thus, auxiliary cooling equipment, such as a secondary quench tower, a water jacketed cooler, or an atmospheric cooler must usually be interposed between the reactor outlet and the collection equipment.

Such auxiliary cooling equipment is lined, primarily for economic reasons, with mild steel. A long-standing problem in the art has been the tendency of mild steel cooling equipment to burn out from within so that it is no longer serviceable. When such equipment reaches the failing point, it must be taken out of service, and when there is no stand-by cooling equipment, the reactor itself must be shut down until repairs can be made. Early burn-out is a particularly acute difficulty with atmospheric-type coolers, which, despite this problem, have other advantages which encourage their use. However, these advantages are largely offset by the expense of periodic shut-downs for the renewal of badly deteriorated atmospheric cooler flues. By a careful investigation of conditions prevailing in furnace combustion-type reactors, we have traced the problem of cooling equipment burn-out to faulty quenching in the reactor. On the basis of such investigation we have discovered and developed a solution which may be best understood when viewed against the background of past practices.

Among the types of apparatus which have been previously utilized to inject quenching fluid are the chamber wall type and the axial spray type. In both types, the quenching fluid enters the reactor tunnel at a point downstream of where decomposition takes place. In the chamber wall type the quench fluid is injected into the tunnel through a pipe positioned in a passageway through the wall of the tunnel. The pipe terminates in a spray nozzle which is usually just flush with the wall of the tunnel. In the axial spray type of quench apparatus the pipe extends to the center of the tunnel where it bends so that the discharge nozzle positioned on the end thereof is directed upstream or downstream along the axis of the tunnel. While the two types of quenching apparatus just described have been used for a number of years by most carbon black producers, they have their limitations.

For instance, when using the chamber wall type of quenching apparatus, it was found that there was difficulty involved in injecting sufficient quenching fluid to obtain the desired degree of cooling without wetting down the tunnel walls. If the rate of quench fluid addition was kept high enough to maintain product standards, quench fluid impinged on the walls of the tunnels and accumulated in the quench section of the reactor. Although some of this water was carried out of the quench area and evaporated by the turbulent gases therein, still another portion thereof remained behind to evaporate from the "floor" of the tunnel, leaving a deposit of water salts behind. In time the accumulation of salts would grow so large that the accumulation would form a dam, causing excess quench fluid to back up into the portion of the reactor where decomposition of the feedstock was taking place.

The backing up of accumulated quench fluid into the decomposition section of the reactor is known as "wetting down of the reactor" to operating personnel experienced in this art. This is a particularly difficult problem because of its effects upon furnace operation. In a wetted down reactor, part of the heat of the combustion gases introduced into the tunnel is consumed in evaporating the backed up quench water and in heating the resultant vapors. The removal of heat from the combustion gases in this manner produces a change in the temperature at which the decomposition reaction takes place, thus altering the properties of the product and necessitating compensatory adjustment of the rates of quench water addition and/or combustion. These temperature variations and compensating changes introduce considerable instability into the operation of the reactor and disturb the uniformity of the product.

Until the advent of the present invention, this problem has been a dilemma for operating personnel. The most obvious expedient for avoiding wetting down the reactor is to cut down the rate of quench water addition initially to avoid the accumulation of water altogether. However, this is an illusory solution. When the flow of quench fluid is diminished sufficiently to prevent wetting down the tunnel there is insufficient and uneven cooling of the smoke. Unsatisfactory cooling of the smoke subjects the downstream cooling equipment to higher temperatures than it can successfully withstand, leading to early burn-out. Poor cooling also makes it difficult to maintain some of the critical properties required in the final product, such as small particle size. Indeed, faulty quenching is an obstacle to economical satisfaction of the present growing need for more distinctive grades of black and for better product quality control.

Even though the axial spray system makes it possible to achieve improved cooling, it too will wet down the reactor walls, especially when the gas velocity through the tunnel is low. Furthermore, the axial spray type of quench apparatus suffers from an additional disadvantage, that of spray nozzle erosion. The nozzle being stationed at the axis of the tunnel is constantly bathed in a hot atmosphere and is unceasingly bombarded with multitudes of small hard particles which rapidly eat it away. When badly eroded, it fails to disburse the quenching fluid efficiently and must be replaced, necessitating the shutting down of the reactor.

If one is forced to rely on either of the systems of quenching described above, it appears that a compromise must be made between equipment endurance, product quality and efficiency. The disadvantageous use of nozzles in the tunnel surface can contribute to early and costly failure of auxiliary cooling equipment and in some instances to poor yield. The same is true to an extent of axially trained nozzles, unless the rate of water addition is kept high. At high rates of water addition there is the problem of unstable furnace operation with an attendant lack of product uniformity. Early burn-out, low yields, poor product quality and nozzle erosion all create an undesirable degree of maintenance expense, shut-down time and waste of materials. Therefore there continues to be a demand for improvements in quenching apparatus for furnace combustion type reactors.

It is a principal object of this invention to fulfill the above demand. Further objects of this invention are to provide apparatus for: (1) promoting thorough mixing and vaporization of quench fluid in a carbon black furnace; (2) virtually eliminating deposition of moisture on the surface of the reactor tunnel; (3) affording a large degree of protection against nozzle erosion while maintaining some of the advantages of axially mounted nozzles; (4) encouraging higher yields of acceptable products by increasing quenching efficiency; (5) reducing the amount of excess quench fluid that must ordinarily be employed; (6) encouraging higher product quality without unduly taxing the life of equipment; and (7) reducing the amount of maintenance required on equipment connected to the downstream end of a reactor.

The above objects are attained in a furnace combustion type carbon black reactor having an elongated tunnel, including a quench section, by providing the reactor with means attached to the surface of said tunnel and extending inwardly therefrom for effecting a substantial local reduction in the cross-sectional area thereof, and with inwardly directed quench spray means, located substantially entirely within said first-mentioned means, for injecting a quenching fluid into said reactor. In a preferred embodiment of the invention, there are a plurality of quench spray means having oval spray patterns in which the major semi-axes thereof are perpendicular to the axis of said quench section.

Although the present invention is applicable to a broad variety of reactors, nevertheless it can be more easily described and its advantages best appreciated by considering its application to a specific reactor chosen for illustrative purposes. For these purposes, therefore the invention will be discussed in conjunction with the accompanying drawings, in which:

FIGURE 2 is a sectional view similar to FIGURE 1, taken along section lines 2—2 in FIGURE 3, showing the upstream or inlet end of the reactor with the burner, air and feedstock supply means in place;

FIGURE 3 is an end view of the reactor, corresponding to FIGURE 2;

FIGURE 4 is a detailed view of the burner and feedstock supply means separated from the remainder of the reactor;

FIGURE 5 is an enlarged portion of FIGURE 1, showing the quench section of the FIGURE 1 reactor with the quench nozzles in place;

FIGURE 6 is similar to FIGURE 5, but shows a preferred modification of the quench spray means;

FIGURE 7 is a sectional view taken along section lines 7—7 in FIGURE 6.

Figure 1:
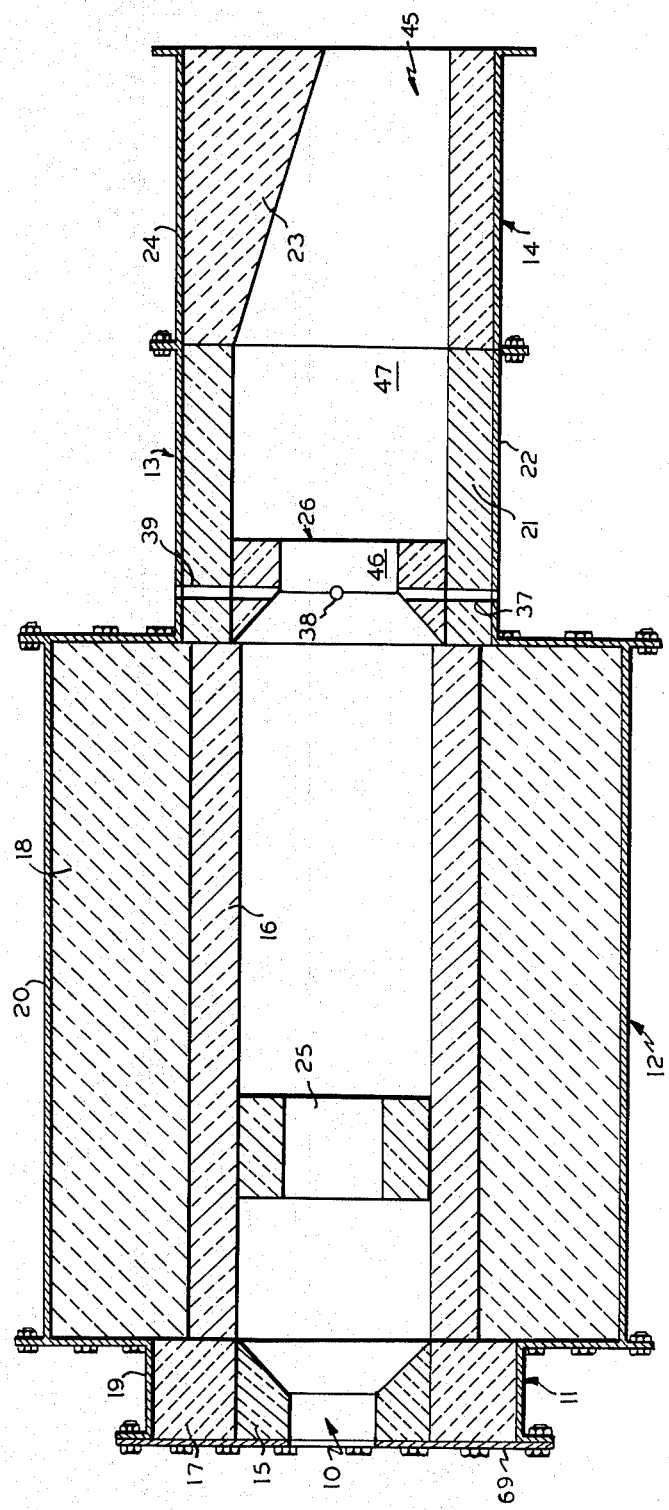
FIGURE 1 is a vertical, longitudinal section of a carbon black reactor modified in accordance with the invention, the quench nozzles, burner, air and feedstock supply means being omitted therefrom.

Referring to the drawing, it will be observed that the reactor includes an inlet section 11, having a refractory innerlining 15, a secondary layer 17 of insulating refractory material, a sheet metal outer covering 19 and an end plate 69. Connected to end plate 69 about mouth 10 of the inlet section is a duct 70 opening into an air scroll 71, which in turn is connected by a down-comer pipe 72 to fans (not shown) for blowing combustion-supporting or process air into the reactor. Extending through the air scroll 71 along the axes of duct 70 and inlet mouth 10 is the fuel and feedstock injection means.

As shown in FIGURE 4, the fuel and feedstock injection means has a feedstock pipe 61 having an inlet 68 terminating in a nozzle tip 62. The feed stock pipe is enclosed by a larger pipe 63, concentric therewith, which carries gas from an inlet 67 through the space between pipes 61 and 63 to fuel head 64 which surrounds feed stock spray tip 62. The fuel passage is secured against leakage at its outer end by packing 66. Fuel head 64 has a plurality of orifices 65 arranged about its periphery for discharging the fuel into the reactor.

The various means just described have the ability to propel a spray of feed stock material into the furnace section 12 of the reactor in the midst of a fiery, turbulent blast of hot combustion gases. The shape of the scroll 71 imparts a whirling motion to the air which enters the tunnel, the air translating part of its kinetic energy to the injected fuel and feed stock to impart a similar motion to them.

The furnace section 12, shown best in FIGURE 1, is immediately adjacent the inlet section 11 and is also provided with a refractory inner lining 16, a secondary layer 18 of insulating refractory material and a sheet metal outer covering 20. The furnace section is somewhat elongated and includes, at an intermediate point therein, a mixing orifice 25. The mixing orifice is simply an annular ring formed in or secured to the cylindrical lining 16. The feed stock injector is trained on the center of this orifice.

Connected to the downstream end of the furnace section is the quench section 13. It is provided with a refractory lining 21 and with a sheet metal outer covering 22. No insulating material need be provided in the quench section however. Intermediate the upstream and downstream ends of the quench section is the means 26 which has been provided therein accordance with the present invention for locally reducing the cross sectional area of the tunnel. This feature will be described in greater detail after the remaining conventional aspects of this embodiment have been touched upon.

To the downstream end of the quench section 13 is secured the end section 14. This includes an inner lining 23 of insulating refractory material and a sheet metal outer cover 24. The insulating refractory material is used here, not for its insulating qualities, but rather because of its durability and relative cheapness as compared to the high grade linings for the inlet, furnace and quench sections of the reactor. Despite the fact that the end section 14 tapers down to an outlet portal 45 somewhat smaller in cross sectional area than that of the remainder of the reactor, it is fair to say that the sections 11, 12, 13 and 14 constitute a generally tubular reactor tunnel. To the downstream end of this tunnel are connected various well-known types of collection equipment which form no part of this invention.

Having discussed in a general fashion some of the more conventional aspects of the reactor, we will now return to a detailed consideration of the various elements which, in this embodiment, constitute the invention. This embodiment, as shown in FIGURES 1, 5, 6 and 7, includes a constriction 26 in the quench section defining an opening 46 of reduced cross sectional area with respect to the cross sectional area of the furnace section 12. An expansion chamber 47 is located in the tunnel intermediate the constriction 26 and the tunnel outlet portal 45, the expansion chamber having a substantially larger cross sectional area than the aforesaid opening. As will become clear from the explanation which follows, the relationship of the constriction to the expansion chamber is such as to provide a relatively sudden and abrupt transition from the relatively smaller area of the opening 46 to the larger area of the expansion chamber 47. This promotes turbulence and eddying in the expansion chamber which, in many cases, is an important factor in the successful operation of the invention. Some sort of quench spray means is provided in the surface of the opening, along with some means for supplying quench fluid thereto under pressure.

In this embodiment, the constriction 26 may, for purposes of explanation, be regarded as being divided into two portions, an upstream portion 27 and a downstream portion 28. The upstream portion 27 is a circular member having an outside diameter equal to the inside diameter of the quench section. It is provided with a frusto-conical surface 49 converging in the downstream direction. The downstream portion 28 is adjacent the downstream end of upstream portion 27. It comprises an annulus having an outer diameter equal to the interior diameter of the quench section, a cylindrical inner surface 52 and a planar downstream face 48 which is generally perpendicular to the axes of quench section 13 and constriction 26.

While the division of the constriction 26 into two portions furnishes a simple approach to a description of this embodiment thereof, this is not meant to imply that the construction must necessarily have a two-piece construction. As a practical matter the entire assembly will be most frequently assembled from a relatively large number of specially shaped firebrick 50 as shown in FIGURE 7. On the other hand, it may be possible to fabricate the upstream and downstream portions 27 and 28 as a single piece of refractory material, especially cast for use in such reactors. No departure from the scope of the present invention is involved in modifications of this nature.

In the embodiment of the constriction which is shown in FIGURES 1, 5, 6, and 7, the flat downstream surface 48 is not only part of the constriction, but it is also the upstream end of the expansion chamber 47. In this embodiment, the chamber happens to be defined by the surface 47, that portion of the quench section liner 21 which is downstream of said surface and the liner 23 of end section 14. The perpendicularity of surface 48 with respect to the constriction axis has the effect of creating a rather abrupt transition from a zone of relatively small cross sectional area in the opening 46 to the expansion zone of relatively large cross sectional area provided in chamber 47. This abruptness is purposefully provided, since it has the salutary effect of adding turbulence to the gases exiting the constriction and of promoting a widespread formation of eddies in chamber 47, especially along the surface of lining 21 where they are needed to pick up moisture which may collect on the walls thereof. This helps insure thorough dispersion of the quench fluid and its complete vaporization in the reactor, thus aiding in preventing the carry-over of unvaporized water into downstream equipment. Since the generally perpendicular surface 48 and the chamber 47 cooperate to promote additional turbulence and eddying among the combustion gases, products and any unvaporized quench fluid therein, they may be accurately referred to as means for promoting eddying and turbulence.

It should be understood that effects of the type mentioned above are discouraged by reactors wherein the cross sectional area of the quench section is restricted with respect to that of the furnace section but in which there is no abrupt transition into an expansion zone within the reactor. Thus, reactors which have a quench section of reduced cross section as compared to the furnace section, followed by a conduit of approximately the same cross sectional area as the reduced portion, or by gently divergent walls, should not be expected to perform as effectively as the present embodiment.

This is not intended to leave the impression that the surface 48 must in all cases be geometrically perpendicular to the constriction axis. For instance, the surface 48 could be replaced by tapered or frusto-conical surfaces slanting upstream or downstream. The inner surface 52 of the constriction could be extended downstream somewhat so that it over-hangs the surface 48. The intersection between the surface 48 and the quench section lining 21 could be rounded off to do away with the sharp corner shown in the drawings. The term "generally perpendicular" is intended to embrace such modifications. Where the surface joining the constriction opening with the expansion chamber comprises walls which diverge from one another in the downstream direction, care should be taken to see that the angle of divergence is sufficiently great, at least about 90°, to insure adequate eddy formation and increased turbulence.

Having described the constriction, we will now turn to a consideration of the quench spray means which cooperate therewith. In accordance with the invention, quench sprays are located in the locus of the constriction. In other words, the quench sprays are situated at one or more points on the inner surface of the constriction between the upstream end of the upstream portion and the downstream end of the downstream portion thereof. The quench sprays may comprise one or more nozzles, such as the nozzles 29, 30 and 31. A fourth nozzle is present, but has been omitted from the sectional views. These nozzles produce a conventional conical spray pattern. They are connected by conduits, such as conduits 33 and 35 in FIGURE 2, to a supply of quenching fluid (not shown). In the present embodiment, the quench nozzles point radially inward towards the axis of the quench section. They are housed in passageways 37, 38, 39 and 40 through the body of the constriction, the passageways being perpendicular to the axis of the quench section. We have found it most convenient and effective to locate the passageways housing the quench nozzles approximately at the point where upstream and downstream portions 27 and 28 meet. The heads of the nozzles are generally flush with the surface of the restriction. While the nozzles may in some cases be withdrawn into the passageways or extend out of the passageways slightly, nozzle erosion is more easily avoided when the nozzles are mounted substantially entirely within the passageways. This is the preferred mode of positioning the nozzles.

The nozzles need not necessarily lie in the same plane. Similarly, they need not always be mounted at the exact position shown, but may be moved to positions slightly upstream or downstream as long as they remain within the limits of the constriction.

Although we prefer to use four nozzles, equally spaced about the periphery of the constriction, the number may be increased or decreased and the spacing may be altered. Generally speaking, as the number of nozzles is reduced, the uniformity of dispersion of the quenching fluid also diminishes somewhat.

It is also possible to vary the attitude of the nozzles. By altering the attitude of the nozzles, we refer to the practice sometimes followed in the art, of canting the nozzles from the perpendicular so that they point slightly upstream or downstream. They may also be canted in a tangential direction in order to impart a swirling effect to the quench fluid as it enters the chamber.

Another embodiment of the invention as shown in FIGURES 6 and 7 includes the provision of oval or elliptical sprays in the locus of the constriction instead of conical sprays. We have discovered that with or without an expansion chamber downstream of the constriction, an even higher degree of efficiency in quenching can be obtained by substituting oval sprays for the conical sprays which are conventionally employed, as illustrated in FIGURE 5. This discovery is of particular value because it sometimes happens under acute conditions that the mere provision of a constriction at the point of quenching does not completely alleviate wetting down of the tunnel. This feature of the invention will now be explained as a modification of the previously described embodiment. However, it should be understood that each and every element of the previous embodiment will not always be a necessary adjunct of the present feature.

As shown in FIGURE 6 and 7, nozzles 41, 42, 43 and 44 are situated in the locus of the constriction 26 in the same manner as heretofore explained in connection with the nozzles 29, 30, 31 and their companion fourth nozzle. Nozzles 41–44 are connected through conduits 57, 58, 59 and 60 respectively to a source of quenching fluid outside the reactor. As may be observed from FIGURES 6 and 7 the major axes 53 of the oval sprays lie perpendicular to the axis of the constriction 26, while the minor axes 54 lie parallel therewith.

In FIGURE 6 the angle $\alpha'$ signifies the included angle of the oval spray 41 measured on the minor semi-axis 54 of the oval which in this case happens to coincide with the longitudinal axis of symmetry of the quench section. In FIGURE 5, angle $\alpha$ identifies the included angle of the conical spray, measured on the same axis. The included angle $\beta$ of the conical spray along its major semi-axis 53 is shown in FIGURE 7. As may be observed by comparing angles $\alpha$ and $\alpha'$ in FIGURES 5 and 6, the oval spray pattern 55 can be made considerably more compact in its longitudinal dimensions without sacrificing lateral coverage. As shown in FIGURE 7 four quadrate oval spray nozzles with an obtuse included spray angle $\beta$ on the major semi-axis obtain rather thorough coverage of the cross sectional area in the constriction.

In the description of the invention to this point, no particular feed stock has been specified for use in the apparatus since the invention is not restricted thereby nor is there any desire to so restrict it. Generally, any gaseous or liquid hydrocarbon may be employed in the apparatus. As used throughout the specification and claims, therefore, the term "hydrocarbon feed stock" is intended to mean, generally, any hydrocarbon. Thus, natural gas as well as heavier hydrocarbon oils from both petroleum and non-petroleum sources may be employed. Such oils may contain aliphatic hydrocarbon compounds whether acyclic or cyclic, saturated or unsaturated or an aromatic hydrocarbon. The hydrocarbon fuel likewise may be varied and may be the same as or different from the hydrocarbon feed stock. Generally, however, the hydrocarbon fuel will be natural gas if readily available.

A combustion-supporting oxygen-bearing gas is employed. It may be air, oxygen-enriched air, oxygen or the like, but, for practical reasons, will usually be air. The amount of combustion supporting oxygen-bearing gas employed will vary depending upon the hydrocarbon fuel as well as the grade of carbon black being produced. The amount of oxygen employed in any particular case may be readily determined by one skilled in the art. Usually, the amount of oxygen employed will range from about that stoichiometrically required to obtain substantially complete combustion of the hydrocarbon fuel to as much as 125–150% of the stoichiometric amount.

The following examples further illustrate the invention. These examples are not included by way of limiting the invention. All the examples are conducted in various forms of the reactor disclosed in FIGURES 1–4. In every case, the respective lengths of the inlet, furnace, quench and end sections are 9", 5'–4½", 2'–3", and 2'–3". The mixing orifice is 13½" from the upstream end of the furnace section, is 9" long and has an opening 9" in diameter. The interior diameters of the quench and furnace sections are 22" and 18" respectively. The end section tapers from the full diameter of the quench section down to a 12" opening. The reactor is put into operation using a feedstock having the following analysis:

| | |
|---|---|
| Gravity, API, @ 60° F. | 1.4 |
| Pour point ° F. | 37 |
| Flash point ° F. | 262 |
| Viscosity, SSU, @ 210° F. | 71.1 |
| Carbon residue, Conradson, percent | 13.6 |
| Ash, percent | 0.029 |
| Sulfur, percent | 1.05 |
| Asphaltenes, percent | 5.6 |
| Aromatics, percent | 79.1 |
| Carbon, percent by wt. | 90.49 |
| Hydrogen, percent by wt. | 1.05 |

Distillation, °F., at 760 mm.:

| | |
|---|---|
| IBP | 396 |
| 5% | 610 |
| 10% | 695 |
| 20% | 729 |
| 30% | 763 |
| 40% | 792 |
| 50% | 833 |
| 60% | 868 |
| 70% | 922 |
| 80% | 985 |

The feedstock is heated before charging and is injected in atomized form with the aid of natural gas as an atomizing fluid. Natural gas is also the fuel. Air is the oxygen-bearing gas used to support combustion. The resultant carbon black-bearing gases pass out of the reactor through a mild steel atmospheric cooler into a collection system.

Example I

A reactor corresponding to the above description except for the omission of the constriction, is operated in the manner described, using a single chamber-wall type quench spray. The reactor is operated continuously for 10 days. About the end of the fourth day, some instability is noted in the operation of the reactor. Compensating adjustments are made in quench water and combustion rates from time to time to keep the reactor in operation. At the end of the 10 days the reactor is shut down and is opened for inspection. A mound of stubbornly adherent water-salt deposits is found in the bottom of the quench section along with an accumulation of unevaporated quench water. Without disturbing the accumulated salts, the reactor is put into operation again and it remains in operation until one of the flues of the mild steel atmospheric cooler burns out, at which time the reactor is shut down for replacement of the flues.

Example II

All conditions are similar to Example I, except that an axial quench spray is used. A very small degree of improvement is obtained, but the problems described in Example I still prevail.

Example III

All conditions of operation are the same as were present in Example I, except that the quench section is provided with a constriction in accordance with the invention. The constriction is identical to that shown in FIGURE 5. The frusto-conical surface of the constriction commences at the joint between the furnace and quench sections and diverges from the quench section wall at a 45° angle. The opening in the constriction is about 13" as opposed to the 22" diameter of the quench section, while the length of the constriction is only about 9". Thus the constriction produces a major reduction in the cross sectional area of the tunnel which is quite local in nature.

The constriction has two portions, the upstream portion, having the frusto-conical surface thereon and the downstream portion of an annular nature. These portions are of equal length and meet in a plane perpendicular to the axis of the tunnel. There are four quadrate nozzles located in this plane on radii emanating from the axis of the quench sections. These nozzles have conical spray patterns and have outer tips which are flush with the inner surface of the constriction.

When this reactor is operated over a period of time, it is noted that the life of the atmospheric cooler flues is extended. Improvements in the stability of reactor conditions are observed. Wetting down of the tunnel is significantly diminished and quenching proceeds more effectively.

Example IV

All conditions are the same as in Example III, except that the conventional, conical spray pattern nozzles are replaced with the type of nozzle illustrated in FIGURES 6 and 7. These nozzles have an oval spray pattern in which the minor semi-axes of their spray patterns, viewed in planes normal to the nozzle axes, coincide with or are parallel to the longitudinal axis of the constriction 26. The major semi-axis of course is perpendicular to the same axis. Angle $\alpha$ is 20°, angle $\beta$ is 110°.

The instability noted in the reactor of Example I is not experienced with this reactor. Inspection after 10 days reveals a complete absence of water in the reactor and a very thin layer of metal salt crystals which are readily removable. Upon being put back into operation the reactor continues to operate more than twice as long as the Example I reactor without burning out any flues in the atmospheric coler. Savings in cooler maintenance are estimated at about 50 percent.

It should be understood that the dimensions and angular relationships set forth in the above examples are only given for illustrative purposes and may be varied within the scope of the invention.

We claim:

1. In a generally tubular, refractory-lined furnace combustion-type carbon black reactor having an upstream inlet, a furnace section, a quench section, a downstream outlet, and means for injecting a hydrocarbon feedstock into the reactor in the presence of feedstock-decomposing hot combustion gases, the improvement which comprises: a ring-like constriction in said quench section, said constriction including a frusto-conical surface intersecting at one end thereof with the tubular surface of said quench section and narrowing to an opening of considerably reduced cross-sectional area with respect to the cross sectional area of said furnace section, said opening comprising a generally cylindrical surface extending longitudinally downstream from said frusto-conical surface and terminating in a planar surface generally perpendicular to the axis of said quench section; an expansion chamber in said reactor defined by said planar surface at its upstream end, by said outlet at its downstream end and by the reactor lining intermediate said ends, said expansion chamber having a relatively larger cross sectional area than said opening; a plurality of radially disposed passageways in the body of said constriction, said passageways intersecting the juncture of said frusto-conical and cylindrical surfaces and communicating with the exterior of said reactor; and quench nozzles and supply pipes therefor situated in said passageways, said nozzles being mounted substantially entirely within said passageways and adapted to produce oval spray patterns, said nozzles being situated that the major semi-axes of the spray patterns produced thereby will be perpendicular to the axis of said construction.

2. In a generally tubular, refractory-lined, furnace combustion-type carbon black reactor having an upstream inlet, a furnace section, a quench section, a downstream outlet and means for injecting a hydrocarbon feedstock into the reactor in the presece of feedstock-decomposing hot combustion gases, the improvement which comprises: a refractory construction in said quench section, said constriction including a tapered surface of generally rounded cross section intersecting with the tubular surface of said quench section at one end thereof and narrowing to an opening of considerably reduced cross-sectional area with respect to the cross-sectional area of said furnace section, said opening intersecting with an end surface generally perpendicular to the axis of said quench section; an expansion chamber in said reactor defined by said end surface at its upstream end, by said outlet at its downstream end and by the reactor lining intermediate said ends, said expansion chamber having a relatively larger cross-sectional area than said opening; a plurality of passageways in the body of said constriction, said passageways intersecting with a portion of the surface of said constriction intermediate the upstream and downstream ends thereof and quench spray means situated in said passageways.

3. In a furnace combustion-type reactor having an elongated, refractory-lined tunnel, including a quench section, the improvement which comprises: refractory constriction means in said quench section, attached to said tunnel surface and protruding inwardly therefrom, defining an opening of substantially reduced cross-sectional area with respect to the cross-sectional area of said tunnel, inwardly directed quench spray means in the locus of the constriction means, for injecting a quenching fluid into said reactor, said tunnel including a refractory-lined expansion chamber downstream of said constriction means and of relatively larger cross-sectional area than said opening.

4. In a furnace combustion-type reactor having an elongated, refractory-lined tunnel, including a generally tubular quench section, the improvement which comprises:

a ring-like refractory constriction in said quench section defining an opening of substantially reduced cross-sectional area with respect to the cross-sectional area of said tunnel, said constriction having the same outside diameter as the inner diameter of said quench section and being attached thereto, said constriction being adapted to effect a substantial local reduction in the cross-sectional area of said quench section, and inwardly directed quench spray means located in the surface of said constriction, for injecting a quenching fluid into said reactor, said tunnel including a refractory-lined expansion chamber downstream of said constriction and of relatively larger cross-sectional area than said opening.

5. A reactor according to claim 4 wherein said constriction has a downstream portion and an upstream portion, said upstream portion having a frusto-conical surface.

6. A reactor according to claim 5 wherein said quench spray means is situated at the downstream end of said frusto-conical surface.

7. A reactor according to claim 4 wherein said constriction has a cylindrical inner surface.

8. A reactor according to claim 5 wherein said downstream portion has a downstream face which is generally perpendicular to the axis of such quench section.

9. A reactor according to claim 8 wherein said downstream face is planar.

10. In a furnace combustion-type reactor having an elongated chamber including a quench section, the improvement which comprises: a refractory constriction in said quench section defining an opening of substantially reduced cross-sectional area with respect to the cross-sectional area of said chamber, said chamber also including a refractory-lined expansion chamber that is downstream of said constriction means and of relatively larger cross-sectional area than said opening; passageways in said constriction communicating between the exterior of said reactor and the inner surface of said constriction; and quench spray means located in said passageways for injecting a quenching fluid into said reactor, said quench spray means being adapted to produce oval or elliptical spray patterns, said quench spray means being so situated within said passageways that the major semi-axes of the spray patterns produced thereby will be generally perpendicular to the axis of said constriction.

11. A reactor according to claim 10 wherein said quench spray means includes a plurality of nozzles each located substantially entirely within one of said passageways.

12. A reactor according to claim 10 wherein said nozzles have outer tips which are substantially flush with the inner surface of said constriction.

13. A reactor according to claim 10 wherein there are four quadrate passageways each containing a single nozzle.

14. In a furnace combustion-type carbon black reactor having an elongated refractory-lined tubular tunnel comprising an upstream inlet, a furnace section, a quench section, a downstream outlet and means for injecting a hydrocarbon feedstock into the reactor in the presence of feedstock-decomposing combustion gases, the improvement which comprises: a refractory construction located in said quench section defining an opening which constitutes a major reduction in cross-sectional area with respect to the cross-sectional area of said quench section; a refractory-lined expansion chamber intermediate said constriction and said outlet, said expansion chamber having a substantially larger cross-sectional area than said opening; a surface joining said opening and said expansion chamber, said surface being generally perpendicular to the axis of said opening to provide a relatively sudden and abrupt transition from the relatively smaller area of said opening to the larger area of said expansion chamber, thus promoting turbulence and eddying in said expansion chamber; quench spray means in the surface of said opening; and means for supplying quench fluid to said spray means under pressure.

15. A reactor according to claim 14 wherein said quench spray means comprises a plurality of spray nozzles adapted to produce oval spray patterns, said nozzles being so situated that the major semi-axes of the spray patterns produced thereby will be perpendicular to the longitudinal axis of said constriction.

References Cited by the Examiner
UNITED STATES PATENTS

| | | | |
|---|---|---|---|
| 1,773,002 | 8/1930 | Hunt | 23—259.5 |
| 2,140,316 | 12/1938 | Furlong | 23—277 X |
| 2,864,673 | 12/1958 | Nannini | 23—259.5 |
| 3,013,865 | 12/1961 | Webster | 23—259.5 |

MORRIS O. WOLK, *Primary Examiner.*

JAMES H. TAYMAN, Jr., *Examiner.*